Sept. 13, 1927.  J. J. BATTERMAN  1,642,321
REFRIGERATING APPARATUS
Filed Jan. 12, 1926  5 Sheets-Sheet 1
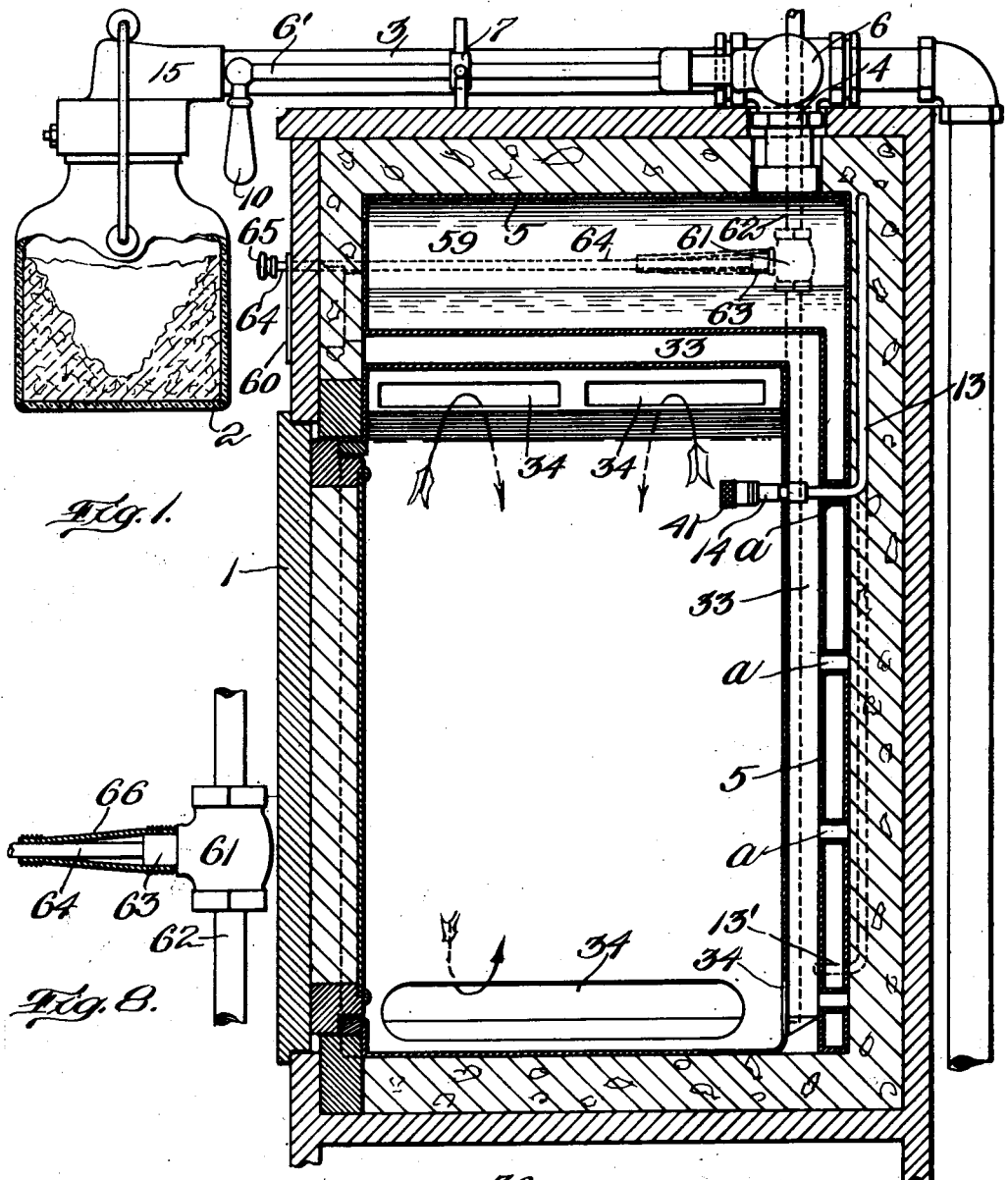
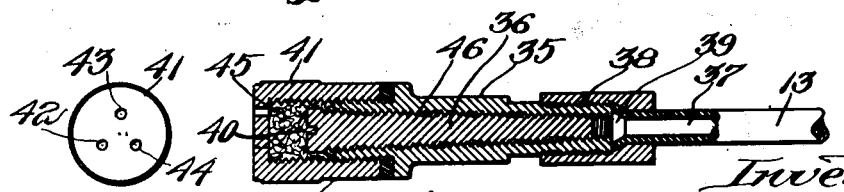
Inventor:
John J. Batterman,
by John A. McManus
Atty.

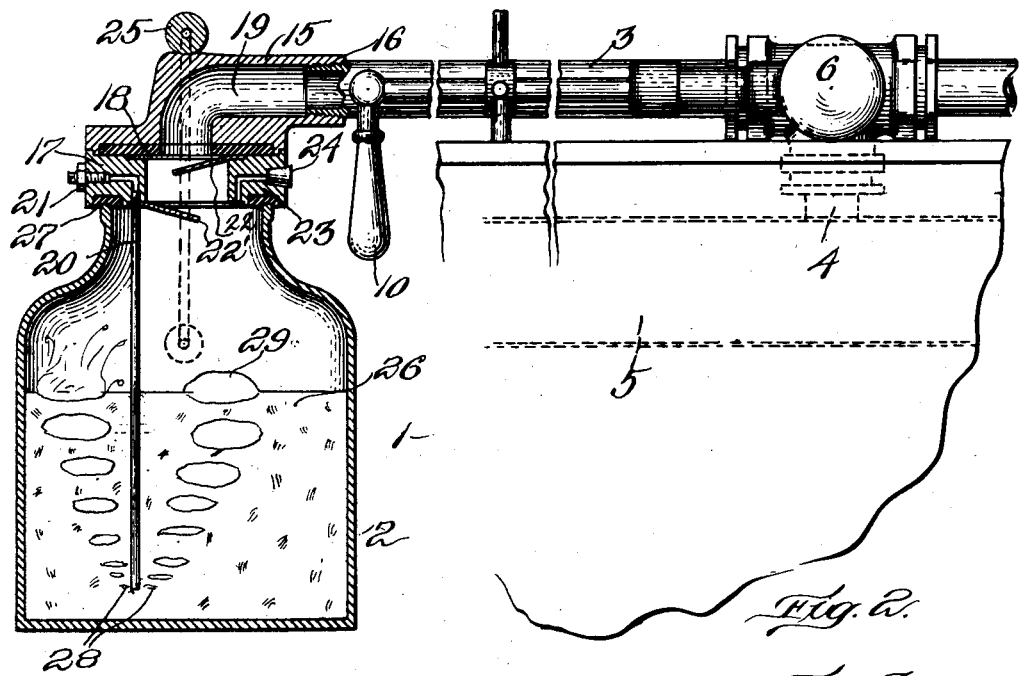
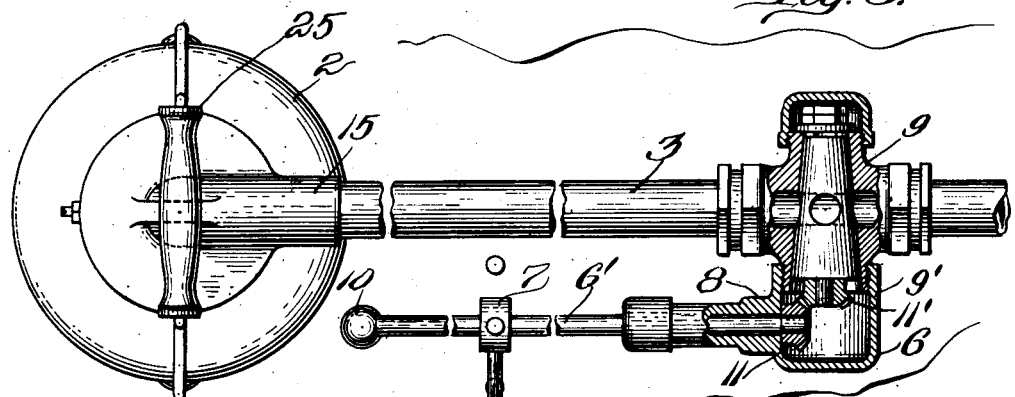
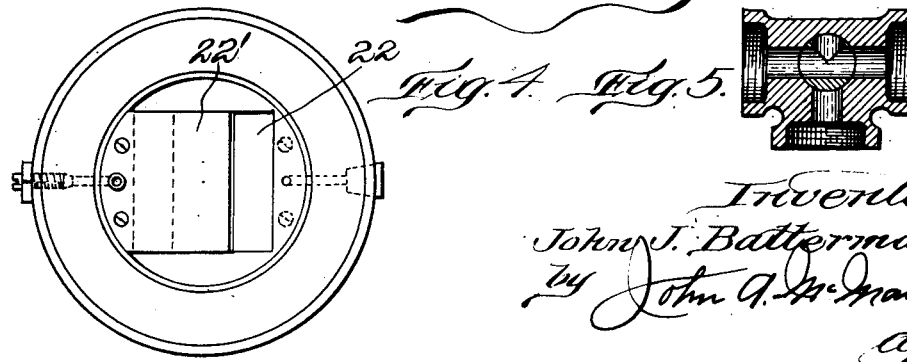

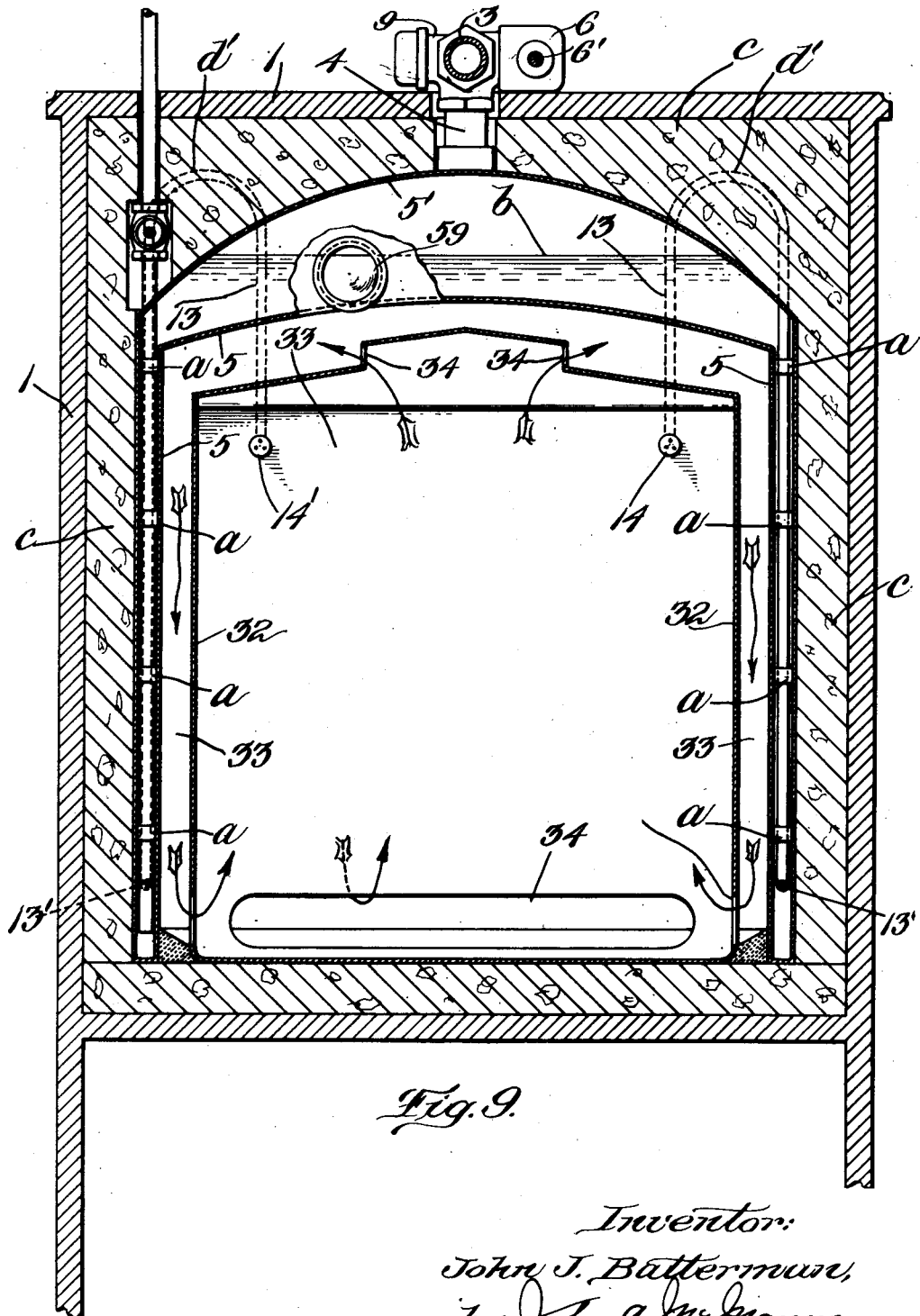

Sept. 13, 1927. 1,642,321
J. J. BATTERMAN
REFRIGERATING APPARATUS
Filed Jan. 12, 1926 5 Sheets-Sheet 4
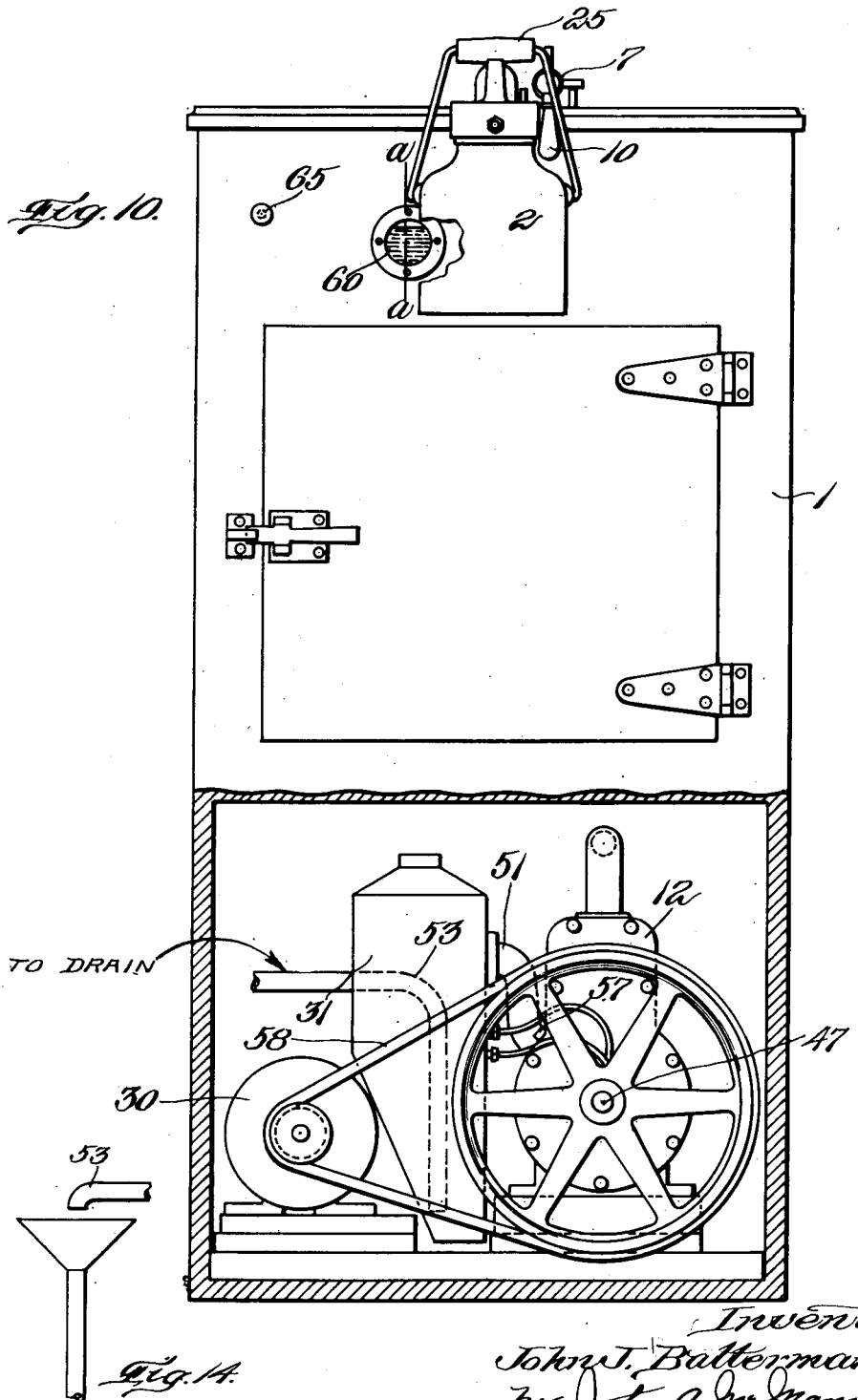

Sept. 13, 1927. 1,642,321
J. J. BATTERMAN
REFRIGERATING APPARATUS
Filed Jan. 12, 1926  5 Sheets-Sheet 5
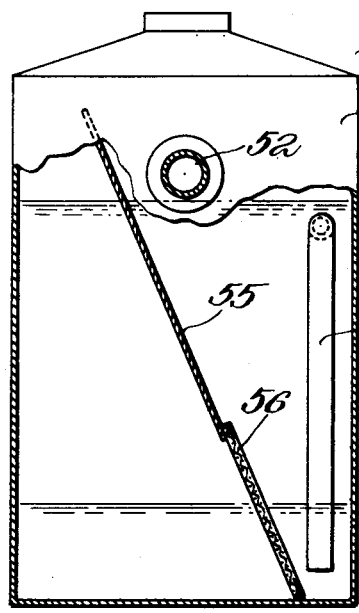
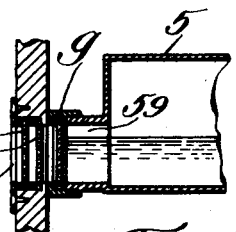
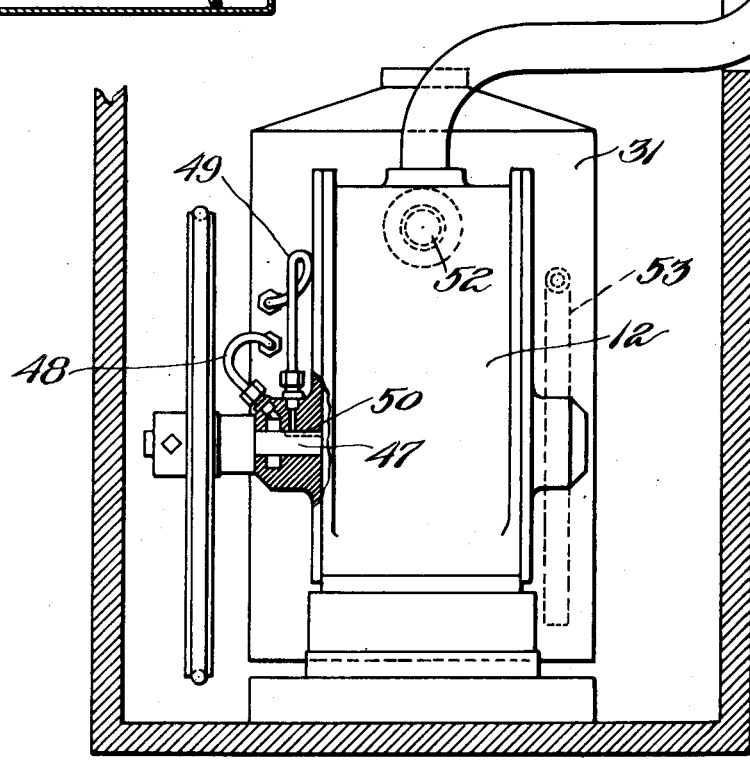

Patented Sept. 13, 1927.

1,642,321

UNITED STATES PATENT OFFICE.

JOHN J. BATTERMAN, OF DEDHAM, MASSACHUSETTS, ASSIGNOR TO VACUUM REFRIGERATING COMPANY, A CORPORATION OF MASSACHUSETTS.

REFRIGERATING APPARATUS.

Application filed January 12, 1926. Serial No. 80,806.

The present invention relates to improvements in domestic refrigerators of the type illustrated, described and claimed in U. S. patent of Alexander I. Mitchell, Patent #1,549,918 of August 18, 1925, filed August 8, 1919. The invention of the present application is the result of further investigations and improvements made in the process and apparatus above mentioned. The invention, as in the previous instance, relates to the type of refrigerating apparatus adapted particularly for domestic use and is designed to secure the greatest simplicity in construction so as to require neither ice supply nor compressors, in which no dangerous, inflammable or obnoxious chemicals are used; an apparatus which can be economically manufactured and operated, and which will require a minimum of attention; and practically foolproof. While it is unnecessary actually to form ice for the purpose of general refrigeration, it is, however, at times desirable to be able to chill drinks and to manufacture a small quantity of ice for table use, or for similar purposes, and also to prepare ice cream, sherbets, and other frozen foods. By means of the method and apparatus this result can also be obtained in a very simple manner.

It is understood by those skilled in the art that the evaporation of water requires the absorption of heat. That heat may be absorbed from the remaining unevaporated portion of the water or from other surrounding material or from any other source. The water may be evaporated in many ways, as, for instance, by reducing the pressure on it, blowing a current of air or dry gas across its surface or utilizing the affinity of some chemical for the water vapor escaping, but these methods are inefficient commercially. The Mitchell invention, of which this is an improvement, takes advantage of this well-known principle by using a reservoir of water to cool his refrigerator, the water in his reservoir being cooled by the principle comprised in said Mitchell invention.

I have invented an organization or system of refrigeration and freezing, the details of which will be hereinafter described, and in which the refrigerating effect is produced by reducing the gas pressure on the body of water to be cooled and utilizing a current of air or gas to pick up and carry away water vapor from this body of water and prevent localization of the cooling to the top surface of the water, and especially to agitate the water at ideal efficiency. In my invention I employ a combination entirely new to the art which comprises the use of a high vacuum, so high that the water or liquid exposed to it will boil as a result of low pressure when the temperature of the liquid is at or near the freezing point, and I combine with this an extremely restricted air leak or bleed whereby two actions are accomplished, namely, the vigorous agitation of the liquid so that the cooling is complete throughout and not in layers and the surface of the liquid is highly expanded as exposed to the high vacuum, the effect of which is to assist the evolution of vapor, while at the same time the air leak or bleed is so slight or so small that it does not materially interfere with the production of the high vacuum I use. In other words, it is so much of a minimum in effect that the vacuum pressure due to the vapor is not materially increased. In maintaining the high vacuum and operating the combination above outlined, which I believe is entirely new in the art, I make use of a special air pump thoroughly packed with oil which oil itself is peculiar in being free from volatile matter, and not absorbent for water vapor under the conditions of use. Such a pump has enabled me to produce a vacuum and rapidly reach even less than two millimeters mercury pressure in mercury column measure above the vapor tension of the liquid in vacuo at varying temperatures during its cooling by evaporation, but useful results may be obtained if this mercury pressure does not rise above six millimeters under like conditions. The resultant effect which I secure by the combination above-mentioned, which is a very valuable part of my invention, that is, the reduction of the vacuum pressure to or below the point of vapor tension of the liquid to be cooled or frozen and the exceedingly small air leak which I call the minimum bleed into the vacuum (so small as not to affect the pressure appreciably) and the special vacuum pump alluded to above is to afford a special advantage in the reduction of size and cost of the apparatus, and the great economy of power and quickness of operation for a determinate cooling effect. In other words, I believe I have made a striking and advantageous departure from the prior art by my combination involving the employment of very high vacuum secured by a pump of special design (having large volumetric capacity) along with a tiny or almost negligible air bleed as distinguished from the former art in the employment of a relatively low vacuum and relatively large air bleed.

During my investigation it has been determined quite definitely that a very minute, or tiny, amount of air or similar gas or mixture of them admitted to the bottom of the body of water or to some depth beneath the surface to be evaporated and allowed to bubble up therethrough causes expansion of the bubble which carries with it the water vapor, and thus presents a much larger surface per unit of area to the evaporating influence; that is, to the influence of reduction of pressure in the receptacle containing the water. The air or gas acts apparently as if it reduced the surface tension of the water so that the bubble is expanded rapidly by the above-mentioned reduction of pressure, greatly increasing the evaporation of the water and the effectiveness of the process. The minute amount of air or gas apparently functions also as an agitator for the water in the receptacle in order to present to the evaporating influence the largest possible surface of water vapor distributing the cooling effect through the water itself. At the same time, I have found that I can reduce the quantity of air or gas to so small an amount that the work added to the pump is practically nil. The function of agitation alone might be done mechanically, but not the function of releasing water vapor from the water itself in the enormous expansion of the entering air or gas, but this mechanical agitation would cost in power, however done, and would also involve inconvenience, complexity of apparatus, and eddies or currents in the water which would minimize the adaptability of the process. With the minute air or gas jet as an agitator admitted a suitable distance from the bottom of the body of water, the bubbles rise up freely to the top while expanding enormously and without any restriction, and the air or gas and water vapor are free to go in whatever direction they will move with the least loss of efficiency in the process of agitation; that is, the internal and external work of agitation is at a minimum.

As the water approaches a certain point in the lowering of the pressure around it, as when it is placed in a vacuum, it becomes to all intents and purposes a liquid supersaturated with gas, only that the gas in this case is its own vapor, ready to escape, and does escape if the pressure be continually lowered, and it finally boils vigorously by giving up the vapor, much as any liquid containing a gas does. For example, carbonic acid water exposed to an increasing vacuum effervesces and gives up gas until at last practically all is removed on gradual increase of vacuum. It is also well known that liquid saturated with the gas when vigorously stirred under low pressures gives up the gas readily. The same is true of water which is ready to give up its own vapor. It may be considered a liquid supersaturated with its own vapor when it is vigorously agitated or stirred. The best means for getting this agitation or stirring when in a supersaturated condition, so far as its own vapor is concerned, is to pass through it a small quantity of air, which, on expanding within the water, agitates the same, so that vapor is much more readily evolved from it than if it were exposed, without such stirring, to a good vacuum. I have also found some decided improvements and advantages over the prior art which result in greatly increased economy and simplification of apparatus for commercial use, and the result of my discoveries also elucidates more clearly the phenomena involved, upon which certain of the prior art was based. By means of the various improvements made by me, I find it possible and preferable to work with a vacuum of not more than six m. m. pressure of mercury (mercury column measure) and preferably less than two m. m. pressure of mercury above the vapor tension of the liquid to be cooled in vacuo at the varying temperatures of said liquid as the cooling process proceeds. While the agitating air that is admitted is extremely small in amount and has practically no effect to break down the vacuum which is being maintained in the apparatus by suitable air pumping and imposing practically no additional work on the pump, but which air on expanding in the interior of the fluid or of the water relieves such water rapidly of its vapor and acts to stir the water in a more vigorous and economical manner than can be conceived of by means of any other agency. As an indication of the efficiency of the pump and the negligible effect of the inclusion of the small air bleed or highly restricted admission of air, it is only necessary to state that notwithstanding this constant admission of air into the liquid in a manner to bubble up and expand therethrough, a vacuum may be maintained above the liquid of less than two m. m. mercury pressure above the vapor tension of said liquid in vacuo at its varying temperatures during cooling.

I have found that whereas in the prior art a given quantity of water could be reduced in temperature from room temperature, viz, 74° to 32° F. with an air bleed or admission of air into the refrigerant at a rate of substantially ½ to ⅓ cu. ft. per minute in 12 minutes, and with an expenditure of power for the 12 minute period of 80 watts with a larger pump requiring a ½ H. P. motor, I can employ an air bleed so small as to be practically unmeasureable, with the employment of an improved form of rotary pump of equal volumetric capacity but smaller dimensions, and a ¼ H. P. motor and an economy in power consumption of less than 50 watts to do this same work under identical conditions of water container, room temperature, etc. An idea of the size of the highly restrictive air bleed employed may be had when it is stated that it may be less than .015 cu. ft. per minute, an amount less than one-fifth of one per cent of the free air capacity of the pump with the high degree of vacuum employed.

The free air capacity of this rotary pump used by me is approximately 20 cu. ft. per minute at 270 R. P. M., or approximately 25 cu. ft. at 330 R. P. M. This pump is oil sealed which has the advantage that in addition to providing a tight sealing it is conducive to lubrication of all moving parts, and contributes to the ability to produce (with small air bleeds such as mentioned heretofore) very high vacuums with minimum power consumption. In fact, I have been able to produce a vacuum under static conditions (that is, without any air bleed) as good as 1 m. m. absolute or better as near as can be determined by ordinary visual gauge reading, or to put it another way, 1 have found that with my organization of a household refrigerating system I am able to maintain a box temperature of 43° to 45° F., and I produce an ice equivalent at less than half the cost over the prior art.

It is desirable that the oil used be a non-emulsifying or non-miscible one, that is, that practically speaking it shall not mix with the condensed water vapor and shall have the property of separating out readily from the evaporating liquid; otherwise, the oil will be entrapped with the liquid as it expands under the reduced pressure and impose additional work on the pump and materially decrease the effectiveness of the refrigerating process, and in a short time cause the system to become inoperative for practical refrigeration. This factor is such an important one that I have provided special means to maintain an effective separation of the water and oil in the apparatus and this means will be referred to more in detail later on in the specification. The pump employed had to be specially designed for the work, and such a pump appears to be the most efficient at relatively low speeds, that is, at speeds of approximately from 80 to 350 revolutions per minute, which has the advantages of marked economy in power, quietness of operation without static and dynamic balancing and avoids the detrimental effects of heating and aerating the oil; and minimizing the work of operation of the check valve.

The ideal vacuum is one which increases in perfection as the vapor tension of the liquid falls with the lowering of temperature of the liquid refrigerant, but I have made such improvements in the technique of the refrigerating process and in the construction of apparatus for carrying it out in combination with apparatus for producing a very high vacuum, that while I am unable, of course, to reach the ideal vacuum conditions above mentioned, I can maintain a vacuum of less than two m. m. mercury pressure above the vapor tension of the liquid in vacuo at its varying temperatures, notwithstanding the admission of air into the liquid in highly restricted amount.

I have further found that if the refrigerating process be carried out in a Mason jar or clear glass battery jar, so that the actions can be easily observed, and no air be admitted to the water, and the cooling be accomplished merely by the reduction of air pressure in the receptacle by pumping out the air to atmospheric pressure, that when a high vacuum is obtained ice will form over the entire surface of the body of water. Where a thermometer has previously been inserted in the water, I have found that the production of ice is limited to the water surface forming downward very slowly thereafter and the cooling goes on in the water to some depth and stops with the lowest temperature 39.2° F. This is apparently explained by the fact that the water at this point has reached its maximum density and has a temperature of about 39.2° F. This is actually the approximate temperature as determined by the thermometer. This means that the circulation of the water from the bottom upwards has ceased, and that the same action has occurred as in the freezing of ponds in the winter time, where the water which is cooled at the top drops to the bottom, because of its higher density and continues to do so until the maximum density is reached at 39.2° F., thus the ice layer is formed on the top of the pond and when the circulation stops by reason of having reached the maximum density of water, the water beneath that point is cooled no further and the fish of the pond are not frozen up.

The above, therefore, proves that in order to freeze the water throughout its body there must be circulation or agitation from the bottom upwards. This is actually what happens when a very small amount of air is allowed to permeate the body of water from the bottom so that it in expanding can circulate up to the top, and I so prove that I can very readily turn into ice crystals the water in the jar or receptacle completely to the bottom, whereas without the air flow this is impossible, or with a larger air bleed a horn of ice only forms at the end of the air pipe.

With the efficient type of refrigerating box such as I have designed (for average household use), it is possible where the temperature of the liquid to be evaporated is not less than approximately 32° F. as a minimum and 59° F. as a maximum, to use an air bleed as small as .015 cu. ft. per minute, or even less, and where the capacity of the pump for removal of free air from the evaporating chamber is substantially 20 cu. ft. to 25 cu. ft. per minute, it will be seen that this percentage ratio of air bleed to the free air capacity of this pump is .0075%. The amount of this bleed, therefore, is so highly restricted (but yet some air bleed is very important) that I have had to devise a special air bleed valve for handling such a small amount of air as there was no such valve available on the market, and the opening in this valve being so small it is desirable to provide an air filter thereon to prevent clogging of the valve by dirt and dust, thus ensuring a continuous passage of free air through this valve. I have also found that with such a small air bleed and high factor of evaporation such as is afforded when the liquid subjected to a vacuum sufficient to cause ebullition or boiling thereof is secured, the power consumption is reduced very considerably; in fact, the maximum reduction of power consumption is obtained under such conditions.

I have further found that with temperatures of the liquid ranging between 36° F. and above, the evaporation is higher and much more economical to operate than at lower ranges where the drop in temperature is slower and the evaporation less, that is, at a slower rate. I have, therefore, constructed a refrigerator with a tank surrounding the food compartment on the sides, back and top and find that by maintaining a water temperature of from 36° to 42° in the tank, the range of food compartment temperatures will be from 42° to 45° in an average size of household box.

Referring to the accompanying specification and drawings which illustrate more specifically the apparatus by which my process is carried out, Fig. 1 represents a side elevation in partial section of a refrigerator embodying the principles of my invention; Fig. 2 represents a partially broken view in side elevation of the refrigerating box and an elevation in partial section of the external bottle or receptacle and means for securing a vacuum tight joint therewith together with the air inlet means and baffling device in the fitting or collar; Fig. 3 represents a plan view in partial section of certain of the refrigerator attachments and especially showing a mechanism for operating the air gate valve; Fig. 4 is a bottom plan view of the attaching collar shown in sectional elevation in Fig. 2, and illustrating the relation of the baffle plates in said collar; Fig. 5 represents a section of the valve actuating mechanism of Fig. 3 illustrating the detail arrangement of the valve opening and closing means; Fig. 6 is a sectional elevation illustrating the air bleed valve for regulation in highly restricted amount of air to be passed therethrough and also a filter in the valve to prevent clogging of the latter by dust and dirt; Fig. 7 is a front view of Fig. 6 looking in the direction of the filter end of the valve; Fig. 8 represents in detail the valve for admitting or renewing a supply of water to the tank and the means for packing the connection to the operating lever in a manner to prevent leakage; Fig. 9 represents a longitudinal sectional elevation of the refrigerator illustrating the interior relations of the water tank, air bleed valves, air circulation passages for the food compartment, and the like; Fig. 10 is a front elevation of the refrigerator with the door to the bottom compartment broken off to show the pump and oil supply tank, and illustrating the external bottle connection at the top; Fig. 11 is an elevation of the pump and oil supply tank looking in the direction of the arrow, Fig. 10; Fig. 12 is a view of the oil supply tank in section looking in the opposite direction to that of Fig. 11; Fig. 13 is a vertical sectional elevation of the water gauge and illustrating its relation to the cooling tank, the view being taken on a line a—a, Fig. 1; and Fig. 14 represents the arrangement of water drip from the receptacle for separating the water from the oil to maintain a constant oil level in the oil supply tank.

Referring now to Fig. 1, an illustration of the fundamental principle underlying my invention will be set forth. Let 1, Fig. 1, represent the double walled casing of the refrigerator. Instead of mounting the auxiliary receptacle or bottle on the inside of the casing as heretofore, in the present invention I have arranged such a bottle outside of the refrigerating casing and for that purpose have provided suitable connections between the pump 12 of large volumetric capacity and the auxiliary container or bottle 2. These connections comprise a pipe 3 leading from said pump to the bottle collar or fitting and a communicating pipe 4 to the tank or heat absorbing unit 5. A three-way valve 6 is provided in the pipe 3 which valve may be controlled by a valve stem 6' mounted in suitable bearings 7 and 8, the latter being a part of the valve casing 9 and 9', Fig. 3. The handle 10 on the end of the valve stem 6' is provided for operating the valve stem in order to turn the three-way valve 6 to its respective opening and closing positions by means of suitable gearing, such as the bevel gears 11, 11' in the housing or bearing 9', the details of the valve and the valve stem operation being best shown in Figs. 3 and 5, the parts being oil sealed to be vacuum tight, or a sylphon bellows or similar device may be used as sealing means. The purpose of this three-way valve construction is to enable the operator at will to connect the exhaust pump with the main absorption tank 5 by means of the pipes 3 and 4, at the same time shutting off the port or opening in the pipe 3 leading to the outside bottle or container 2, or reversely, to open the port in the pipe 3 to the bottle or container 2 and close the port leading to the pipe 4 and communicating with the absorption tank 5. In the first instance the pump is operating on the absorption tank 5 to reduce the pressure therein above the liquid, and in the latter case to reduce the pressure above the liquid in the bottle 2. While applicant has illustrated and described a specific form of three-way valve it is to be understood that he does not limit himself to that particular type of valve, but any form of valve system suitable for the purpose may be employed.

In the absorption tank 5 there is provided air bleed pipes 13 leading to the air inlet valves 14 and 14' in the food compartment and communicating by means of the air bleed valve with outer atmosphere, these pipes 13 being shown best in Fig. 9. The function of this air bleed piping is, as has been explained in Mitchell Patent #1,549,918 and in the Mitchell Patent #1,579,451, to admit air below the surface of the cooling liquid for the purpose of expanding through said liquid to the top thereof and by means of the reduction of pressure in the tank produced by the exhaust pump 12. The liquid vapor carried up by the air is expanded in volume enormously so that very remarkable cooling results are obtained by the process.

Referring specifically to Fig. 2 which represents more in detail an apparatus by which the process of refrigeration is practically embodied as an auxiliary to the main cooling tank 5, 15 represents a connection or head which may be screw-threaded to the pipe 3 at 16 for providing a fitting or collar 17 to which a vacuum bottle or other suitable receptacle 2 may be attached external of the refrigerator box 1. The collar or fitting 17 may have a contour or surface at the top thereof which matches the lower contour or shape of the head 15 and be tightly sealed thereto when the vacuum is on by means of a suitable gasket as by the rubber gasket 18. In the head 15 may be cast or otherwise provided a passage 19 communicating with the pipe 3. A depending pipe 20 of relatively small bore is also preferably permanently connected to the collar or fitting 17 and in operative connection with a small air bleed valve 21, this valve being the same in general principle as the two valves 14 and 14' inside the food compartment for controlling the supply of air to the main tank 5, as shown in Fig. 9, and in enlarged detail in Fig. 6. The opening in this valve is a very minute one. Suitable baffles or plates 22, 22' are riveted or otherwise suitably fastened in the fitting 17 as shown to prevent unvaporized liquid from having access from the bottle or receptacle 2 to the pipe 3 and thence to the pump, more especially if the bottle is filled almost to the top, as this would impose additional work on the pump. 23 represents a free air communication between the outside atmosphere and the fitting and indirectly to the receptacle 2, but this passage is normally closed by a cork 24 or a suitable stop cock. The receptacle or vacuum bottle 2 is operatively suspended on the head 15 by means of a handle or bail 25 and is held firmly there by riding on a cam shaped lug or protuberance on the head 15. 26 represents the liquid to be cooled in the bottle 2. An annular gasket 27, say of rubber, is mounted in the fitting 17 for engagement with the bottle 2.

Assuming now that it is desired to cool liquid such as water, tea, coffee, lemonade, milk, etc. in the receptacle 2 and that the pump is in operation, the gate valve lever 10 is turned in such a way that the gears 11 and 11', Fig. 3, will cause the gate valve 6 to cut off communication between the pump 12 and the pipe 4 communicating with the main refrigerator tank 5, thus leaving a direct air communication between the pump and the bottle 2. The minute quantity of air which passes through the air valve 21 and into the air pipe 20 will pass through said pipe and out into the body of the liquid at a substantial distance beneath the surface thereof. This air will emerge in the form of small bubbles as 28, gradually expanding in the liquid until such bubbles increase in area enormously in size as compared with their original size as they are discharged from the pipe 20 into the liquid until they reach the surface in the form of the bubbles 29. This is due to the reduction in pressure produced by the very high vacuum attained by the pump 12, and the process is so effective under such procedure that the pressure in the bottle as measured in millimeters of mercury can be maintained at less than 2 m. m. absolute mercury pressure above the vapor tension of the liquid, as the vapor tension of water at 32° F. is 4.59 m. m. in vacuo; this would mean in the present instance that the total or absolute pressure need not exceed 6.6 m. m. absolute notwithstanding the constant admission of the minute quantity of air into the water through the pipe 20.

With the pump turning at 285 revolutions per minute and using a well known make of ¼ H. P. motor, and one quart of water in the bottle 2, the room temperature being 72° F. and the temperature of the water at the start being 67° F., after 9¾ minutes ice crystals begin to form throughout the liquid, that is, clear to the bottom and with a total expenditure for electrical energy not exceeding 40 watts for the 9¾ minute period.

If it be now desired to remove the bottle 2 from the fitting in order to quickly break the vacuum seal the gate valve lever 10 is turned off to close communication with the pump, the cork 24 is withdrawn or if a valve is provided here for the purpose, the valve is opened and atmospheric air allowed to enter the bottle whence the bottle can easily be withdrawn. If it be desired to cool a liquid in the bottle such as ginger ale, for example, it need only be necessary to quickly freeze a small quantity of water into an ice patty and then supercool the patty of ice, pour in the ginger ale, and the required temperature will expeditiously be reached.

In case alcoholic liquids are to be cooled in the auxiliary bottle, it has been found that an effective thing to do is to withdraw momentarily the cork or stopper 24, which is also used as a means for breaking the vacuum seal between the bottle 2 and the fitting. By withdrawing this cork or stopper, as stated, a small amount of air is allowed to be projected on top of the alcoholic liquid to be cooled or frozen, and in this way undue ebullition of the liquid is prevented. The cork or stopper is then replaced, and the normal cooling or freezing action will proceed. The bleed, in this case, may be $\frac{1}{32}''$ or smaller, and the time in which the air is allowed to penetrate through the bleed may be a half minute or so, although this is only illustrative, as the amount of bleed and time may be varied to suit the purpose.

A substitute for an ice pack may also be afforded by simply cooling water to the required temperature and filling the rubber pack with it, or a mixture of glycerine and water be used to afford still lower temperatures without excessive cost of power.

It has been thought desirable to describe the construction and operation of the refrigerating process in the auxiliary bottle apparatus first in order to better exemplify the principle involved, but as the main purpose of the device is to provide a refrigerating apparatus for household use, the details of this device will now be proceeded with. The main tank 5 in this case may be formed of suitable sheet metal such as galvanized iron and partially surrounds the food compartment; that is, on top, back and two sides, as best shown in Figs. 1 and 9. It is preferably formed with a convex-cylindrical shaped top as illustrated at 5', Fig. 9, for strength in order to prevent buckling under the influence of the high vacuum, and to give a top icing effect. The sides may be braced by the tubules $a$ or the inside and outside walls of the tank may be formed with suitable projections and spot welded. As shown, however, the tank is partially filled with water up to the level $b$ and surrounds these tubules $a$, but of course, cannot enter within them. The tank 5 is suitably surrounded with a good non-conductor for heat such as sheet cork, and the whole enclosed in the refrigerator box 1, provided with a door as shown in Fig. 10, and a compartment beneath the food chamber for the reception of a pump 12 and motor 30 for driving the same. In the present case an oil supply tank 31 is also housed in this compartment with its means for separating the water or condensed vapor which settles to the bottom of said tank. The compartment referred to may also be provided with a suitable door.

Inserted in the food compartment to form a lining for the same is a sheet metal or other suitable lining or receptacle of such dimensions as to leave an air space 33 between it and the outer walls of the main liquid container or refrigerator tank 5. This is for the purpose of additional and uniform cooling for the food compartment, and in the walls of this lining or receptacle 33 are suitable draft openings 34 at the top, bottom of back wall and bottoms of side walls, as shown in Figs. 1 and 9. These openings afford a circulation of cold air through the food compartment, the openings referred to and the spaces 33 between the walls of the two containers, and it has been found that a temperature with this system of cooling, combined with the large storage capacity of the tank 5 is so uniform that the maximum variation from top to bottom of the food chamber may be not more than a few degrees, and is actually less than 2 degrees, and tests over a long period have demonstrated that it is possible to maintain this uniformity of temperature within approximately two or three degrees. At the same time, the food retains its natural moisture and flavor.

The arrows in Fig. 9 represent the path of the circulating air, the cold or dense air, of course, dropping to the bottom always thus maintaining the circulation even with a tightly insulated door.

The air communication to the main tank 5 is by means of the air bleed valves 14, 14', Fig. 9, which are connected into the ends of pipes 13 which extend through the back wall of the tank 5, as best shown in Fig. 1. In order that there may be no leakage of water from the tank when the vacuum is off, these pipes 13 are carried up above the water level $b$ as shown at $d$, $d'$, Fig. 9;

one loop extends through one of the tubules *a* having the bleed valve 14 attached thereto, from thence out of the back wall of the tank up parallel to said wall and around in a bend *d*, Fig. 9, thence down parallel with the back wall of the tank again, and finally enters the bottom of the back portion of the tank at 13', a water-tight joint being made around the pipe at this point. The same arrangement is repeated on the opposite side where the pipe terminates in the air-bleed compartment 14' in the food compartment.

Referring now to Figs. 6 and 7, which illustrate the construction of the air bleed valve in enlarged detail, 35 represents the main body members of the valve which is screw-threaded on its internal bore to receive a screw 36 having complementary screw-threads on its interior, complementary to those in the bore of the member 35, on its interior. The valve is tapered as shown and the threads are preferably very fine. The end of the member 35 which receives the air pipe 13 is secured in air-tight engagement with the latter by means of the screw-threaded ferrule 38, the pipe 13 also having the usual bell-shaped mouth utilized in such cases as shown at 39. The screw 36 is provided with a slot 40 by means of which the screw may be turned into place by a screw driver from the head end of the valve. A knurled cap 41 is screwed onto the head of the valve, but inserted inside this cap and between it and the screw head is a suitable filtering material such as absorbent cotton or the like. Suitable holes 42, 43 and 44 are provided in the cap 41 for the entrance of air into the cap. Air passes through them into the filter 45 and thence along the tapered screw-threads 46 into the bell-end 39 and pipe 13; thence through the pipe 13 beneath the body of the liquid in the tank 5, expanding up through the same to the surface thereof. It was found necessary to provide this specially constructed form of air valve in order to handle such a minute quantity of air, and this quantity of air being so highly restricted it will be obvious that the very fine tapered screw-thread through which the air passes in the interior of the valve would easily be clogged by dust and dirt if the filter 45 were not provided to prevent this and capture such dirt and dust before it reaches the screw-thread. This is important, as the process may cease to function effectively in the absence of such a filter.

Referring now more specifically to the matter of the oil supply tank for the pump, the character of the oil and its handling is a very important item for consideration in connection with a process of the kind involved, and for that reason it is practically indispensable to use a non-emulsifying or non-miscible oil; that is, one which will not readily mix with the condensed water vapor in the system, otherwise, the pump in endeavoring to maintain a high vacuum has additional duty thrown on it in being obliged to re-evaporate the water which is entrapped in an emulsifying oil or which is subject to emulsification after a period of time of use in the pump. In fact, one of the greatest gains made in the economical operation of the system and apparatus by the present applicant is due to his effective study of this problem, as it has enabled him to secure higher vacuums with smaller air bleed, and greatly increasing the volumetric efficiency of the pump by minimizing the detrimental effects on said pump by regurgitation, the net result of which is a great improvement in power economy, and rendering it probable that no existing system of household refrigeration can compete with it because of such economy and simplicity of operation, being dependent only upon the use of air and water, and a high enough vacuum. Oil from the tank 31 is supplied to the shaft 47 of the pump 12 by the pipes 48 and 49, delivering it to a groove 50 in said shaft. In this manner sufficient oil is drawn into the pump for lubricating and sealing purposes. After passing through the pump the oil is returned to the tank 31 by means of the pipe 51 through the exit opening 52 of said pipe. The level of the oil in the tank 31 is indicated at 52, and it is desirable that in order not to churn the oil in falling back into the tank, that the bottom of this exit opening 52 be about on a level with the oil. Churning or turbulence in the oil may impose additional work on the pump. In order to maintain the level, therefore, approximately on a line with the bottom of the exit opening 52 the condensed water vapor which settles to the bottom of the oil because of its greater specific gravity, must be drained off in sufficient amount to keep the top surface of the oil at the required level, and for this purpose a pipe 53 in the tank 31 is provided which has its lower end a sufficient distance below the probable water level to drain off the water in sufficient amount for the purpose. The upper end of the pipe has an exit through the tank, and may terminate in a drain cock 54, Figs. 10 and 14. The proportions of the pipe and the height at which it emerges from the oil are, of course, so determined as to the hydrostatic head that the water only will be drained off and none of the oil, and the pipe is so arranged as to always maintain a certain volume and level of water in the bottom of the tank 31. In order to ensure that there will be little or practically no churning or turbulence in the oil which leaves the tank 31 a septum or partition 55 of any suitable material is operatively mounted in the tank as shown in Fig. 12, and in the lower part of this partition or septum is a screen 56 which functions as a filter for the oil and purifies it of any sediment as it passes therethrough to the delivery side of said partition. By these arrangements the oil which passes from the delivery side of the tank through pipes 48 and 49 to the pump is in a cleansed and quiescent state.

A check-valve 57 is provided on the pump 12 (shown in Fig. 10 better illustrated in Mitchell patents of record) through which the pump exhaust its gaseous fluid (in this case water vapor) to atmosphere. The check-valve 57 is also a very important adjunct in the effectiveness of this process and apparatus, as its function is to increase the work accomplished by the pump for a given amount of energy consumed by the motor 30 which drives the pump by means of the belt drive 58. To state the matter differently, the check valve 57 minimizes the work which would otherwise be required of the pump to produce given requirements for refrigeration and freezing by practically eliminating the detrimental effects of back pressure of the atmosphere and regurgitation on the system.

In order to be able to determine at any time the amount of water in the supply tank 5 a water gauge 59 having a transparent front plate such as glass 60 is provided through which the level of the water supply may be seen. Several windows of glass for suitable sealing and thermal spacing intervene between the outer window 60 and the tank 5, these additional windows being illustrated at e, f and g, Fig. 13. If it is found by observation through the window of this gauge that it is necessary to add to the supply of water in the tank 5, a special means is available for this purpose. Applicant has provided a water valve 61 in the tank 5 utilizing well known water valve construction but modified for the particular purpose, and this water valve is in operative relation with a water filling pipe 62 connected to any suitable water supply. The water valve 61 is shown enlarged in Fig. 8. On its front side it is provided with a lug 63 through which extends a plunger 64 in operative relation on the inside of the valve with suitable openings therein registering with the water admission side of pipe 62 and with the water delivery side of said valve. This plunger 64 extends through the front wall of the refrigerator box 1 and terminates in a knob 65.

In order to add a supply of water to the tank 5 it is only necessary to push in the knob 65. This action opens the water valve 61 and admits water into the tank 5 under the influence of the vacuum therein, and as soon as the desired amount has been admitted, as determined by observation through the gauge window 60 the knob 65 is pushed out by spring action and the further supply of water shut off. Of course, it will be understood that the opening or closing of the water valve 61 may be accomplished by the opposite actions of the lever 64, depending upon the arrangement of the parts, and that it is immaterial whether the knob 65 has to be pushed in to open the valve or pulled out. Referring to Fig. 8, 66 represents a rubber or other suitable envelope around the lug 63 and plunger 64 for the purpose of providing a water and air tight seal around the sliding joint connection to the water valve 61. This envelope may be securely and tightly held as a packing by binding it to the parts with wire as illustrated in dotted lines, Fig. 8. The operation of the refrigerator proper need not be further described. Suffice it to say that the larger tank 5 and its contained liquid is cooled in the same manner as was described in connection with the auxiliary bottle apparatus, except in the case of the larger tank the air bleed pipes 13 are substituted for the pipe 20 in the case of the bottle, and the air bleed valves 14 and 14' in the food compartment are substituted for the bleed valve 21 used with the bottle. Before the main tank is started into operation, of course, the lever 10, Fig. 2, is turned to a position to cut off the vacuum connection between the pump and the bottle and to open the connection between the main tank 5 and the pump.

In accordance with the provisions of the patent statutes, I have described the principle and operation of my invention, together with the apparatus which I now consider to represent the best embodiment thereof; but I desire to have it understood that the apparatus shown is only illustrative, and that the invention can be carried out by other means.

I claim:

1. A method of refrigeration consisting in producing and maintaining a high vacuum above the level surface of a liquid in a sealed container and simultaneously drawing in by suction from the atmosphere normal air at a point below the liquid level admitted through a minute orifice to agitate and disseminate said air through the liquid, the ratio of air disseminated to the full exhausting capacity of the pump being a small fraction of one per cent.

2. A method of refrigeration consisting in producing a high vacuum, preferably below 2 m. m. and not more than 6 m. m. mercury pressure above the vapor tension of the water at the varying temperatures of the latter, above the level surface of a body of water contained in a sealed receptacle and simultaneously drawing in by suction from the atmosphere normal air at a substantial depth below the liquid level, admitted through a capillary opening to agitate and disseminate said air through the body of the water, the ratio of air thus disseminated to the full capacity of the pump being not more than one-fifth of one per cent, and maintaining the high vacuum above described during operation notwithstanding the admission of said air.

3. A method of refrigeration consisting in producing a high vacuum above the level surface of a body of liquid contained in a sealed receptacle, the high vacuum being characterized by being preferably less than 2 m. m. and not more than 6 m. m. mercury pressure above the vapor tension of the liquid at the varying temperatures of the latter, simultaneously agitating the liquid by just that amount sufficient to entrap air or vapor therein in order to present such liquid vapor to the influence of the high vacuum, and maintaining the high vacuum above described notwithstanding the withdrawal of said liquid vapor into the vacuum space and pumping it to atmosphere.

4. A domestic refrigerator comprising in combination a heat insulated casing enclosing a food compartment; a closed water container having a heat absorbing surface in operative relation to said food compartment for cooling the latter; apparatus for producing and maintaining a vacuum preferably less than 2 mm. mercury pressure above the vapor tension of the water in vacuo and not more than 6 mm. at its varying temperatures in said vacuo the said apparatus including a pump for withdrawing air and water vapor from said container and discharging it to atmosphere; a check valve in said pump through which the exhausted air and water vapor is discharged to atmosphere for preventing regurgitation and loss of efficiency of the pump, means for admitting air at a rate of flow approximating less than one per cent of the volumetric capacity of the pump into the water and at a substantial depth beneath the surface thereof, and a motor for driving the vacuum producing apparatus.

5. A domestic refrigerator comprising in combination a heat insulated casing enclosing a food compartment; a heat absorbing element comprising a closed receptacle containing a body of water in operative relation to said food compartment for cooling the latter; a rotary pump of large volumetric capacity and capable of producing and maintaining a high vacuum above the water in said container, a check valve in said pump, means for admitting air into the water at a substantial depth beneath the surface thereof, controlling means for regulating the amount of air admitted into the water that the rate of flow of said air will never exceed more than one-fifth of one per cent of the free air capacity of the pump, a suitable filter on this air controlling means to prevent clogging thereof, and a motor for driving the rotary pump.

6. A domestic refrigerator comprising in combination a heat insulated casing enclosing a food compartment; a heat absorbing element comprising a closed receptacle containing a body of water in operative relation to said food compartment for cooling the latter; a rotary pump of large volumetric capacity and capable of producing and maintaining a vacuum above the water in said container preferably less than 2 mm. and not more than 6 m. m. mercury pressure above the vapor tension of the liquid in vacuo, a check-valve in said pump, a lubricating oil non-miscible with the condensed refrigerating vapor in said pump to prevent regurgitation of the exhausted air and water vapor passing through the check-valve and to effectively seal the pump against the ingress of atmospheric air thereto, means for admitting air into the water at a substantial depth beneath the surface thereof, a controlling means for regulating the amount of air into the water at a rate of flow of said air never to exceed more than one-fifth of one per cent of the free air capacity of the pump, a suitable filter on this air controlling means to prevent clogging thereof, and a motor for driving the rotary pump.

7. A domestic refrigerator comprising in combination a heat insulated casing enclosing a food compartment; a heat absorbing element comprising a closed receptacle containing a body of water in operative relation to said food compartment for cooling the latter; apparatus for producing and maintaining a vacuum preferably less than 2 mm. mercury pressure above the vapor tension of the water in vacuo; a fitting for holding a second water receptacle in vacuum tight connection therewith external of the heat insulated casing, a pump for withdrawing air and water vapor from both water containing receptacles, a check-valve in said pump through which the exhausted air and water vapor is discharged to atmosphere, means such as piping for exhausting air and water vapor from both receptacles by the pump, an air gate valve adjustable to open or close the common passage between the main container and the pump or the auxiliary container and the pump at will, means for admitting a limited quantity of air into the water in both containers, and a motor for driving the pump.

8. A domestic refrigerator comprising in combination a heat insulated casing enclosing a food compartment; a heat absorbing element comprising a closed receptacle containing a body of water in operative relation to said food compartment for cooling the latter; apparatus for producing and maintaining a vacuum preferably less than 2 mm. mercury pressure above the vapor tension of the water in vacuo and not more than 6 mm. at the varying temperature of said water; a fitting for holding a second water receptacle in vacuum-tight connection therewith external of the heat insulated casing; a pump for withdrawing air and water vapor from both water containing receptacles; a check-valve in said pump through which the exhausted air and water vapor is discharged to atmosphere; a means such as piping for exhausting air and water vapor from both receptacles by the pump; an air gate valve for controlling the communication from said means such as piping to the pump and to both receptacles; an openable valve connection in the fitting for breaking the vacuum in the receptacle for the purpose of removing the latter from the fitting; means for admitting a limited quantity of air into the water in both containers; and a motor for driving the pump.

9. A domestic refrigerator comprising in combination a heat insulated casing enclosing a food compartment; a heat absorbing element comprising a closed receptacle containing a body of water in operative relation thereto; apparatus for producing and maintaining a vacuum in the closed water container above the water therein; a fitting for holding a second water container in vacuum-tight connection therewith external of the heat insulated casing; an air pipe depending from said fitting which extends for a substantial distance beneath the surface of the liquid in the fitting container when the latter with its contained liquid is operatively attached to said fitting; an air admission opening for restricting the flow of air to the above-mentioned pipe located in the fitting; an openable valve connection in the fitting for breaking the vacuum in the container and also to admit momentarily a small amount of atmospheric air into the container to prevent undue ebullition of certain liquids; a pump for withdrawing air and water vapor from both water containing receptacles; a check-valve in said pump through which the exhausted air and water vapor is discharged to atmosphere; means such as piping for exhausting air and water vapor from both receptacles by the pump; an air gate valve for controlling communication from said means such as piping to the pump and to both receptacles; means for admitting a limited quantity of air into the water in both containers; and a motor for driving the pump.

10. In a refrigerating apparatus, the combination of a receptacle for a liquid to be cooled, means for supporting said receptacle comprising a fitting with which the receptacle is releasably connected, an air pipe depending from said fitting which pipe extends for a substantial distance beneath the surface of the liquid in the receptacle when the latter is operatively attached to the fitting, a restricted air admission opening to the above-mentioned pipe located in the fitting, an openable valve connection in the fitting for breaking the vacuum connection to the receptacle, an exhaust pump capable of producing a very high vacuum, a motor for driving the pump, and a connection between said exhaust pump and said fitting through which the pump exhausts air from the receptacle when operatively connected thereto.

11. In a refrigerating apparatus, the combination of a receptacle for a liquid to be cooled, means for releasably supporting said receptacle comprising a fitting with which the receptacle is connected, an air pipe depending from said fitting which extends for a substantial distance beneath the surface of the liquid in the reeptacle when the latter is operatively attached to the said fitting with its contained liquid, a restricted air admission opening to the above-mentioned pipe located in the fitting, an openable valve connection in the fitting for breaking the vacuum connection to the receptacle from the fitting, an exhaust pump capable of producing a high vacuum, a motor for driving the pump, a connection between said exhaust pump and said fitting through which the pump exhausts air from the liquid receptacle when operatively connected to the fitting, and suitable baffling means to prevent unvaporized liquid from entering the connections between the receptacle and the pump.

12. Apparatus for producing refrigeration and the like comprising a receptacle containing a body of liquid to be cooled as described, a suitable pump of large volumetric capacity capable of maintaining a vacuum above the body of the liquid of preferably less than 2 m. m. and no more than six m. m. mercury pressure above the vapor tension of the liquid in vacuo at its varying temperatures during cooling, a motor for driving the pump, substantially vacuum tight connections between the pump and the receptacle, an outlet for the removal of air from the receptacle to atmosphere, a check valve in said outlet, means for admitting air at normal pressures to the receptacle and to some depth below the surface of the liquid to be cooled therein in an amount not to exceed more than one-fifth of one per cent of the free air capacity of the pump, a supply of lubricating oil non-miscible with the condensed refrigerating vapor for lubricating the pump and at the same time effectively sealing the pump against the ingress of atmospheric air thereto, and means for separating the condensed refrigerating vapor from the supply of oil to maintain a substantially constant level of said oil.

13. Apparatus for producing refrigeration and the like comprising a housing, a food compartment in the housing, a tank substantially embracing the food compartment, a body of water to be chilled or frozen to a mush contained within the tank, means for maintaining a partial vacuum above the water in the tank comprising a pump of large volumetric capacity for removing air and water vapor from the tank to atmosphere, a free air space between the wall of the tank and the adjacent wall of the food compartment, suitable draft openings in the side walls and top of the food compartment whereby a natural circulating draft of cold air in the food compartment is provided and whereby in conjunction with the storage for cold in the tank increased economy of operation is effected, means for admitting a restricted amount of air at normal pressures to the tank and to some depth below the surface of the water to be cooled therein, a motor for driving the pump all of which elements in combination result in a temperature variation in all parts of the food compartment not to exceed 5°.

14. A domestic refrigerator comprising in combination a heat insulated casing enclosing a food compartment, a heat absorbing element comprising a closed receptacle containing water in operative relation to said food compartment for cooling the latter, apparatus for producing and maintaining a relatively high vacuum therein, a fitting for holding a second water receptacle in vacuum tight connection therewith, a pump for withdrawing air and water vapor from both receptacles, a check valve in said pump through which condensed air and water vapor is discharged to atmosphere, suitable piping for conveying the exhausted air and water vapor from both receptacles by the pump through the check valve, an air gate valve common to said piping and adjustable to open or close the passage between the main container and the pump or the auxiliary container and the pump at will, means for admitting a limited quantity of air into the water in the first named receptacle, and a motor for driving the pump.

15. A domestic refrigerator comprising in combination a heat insulated casing enclosing a food compartment, a heat absorbing element comprising a closed water receptacle in operative relation to said food compartment for cooling the latter, apparatus for producing and maintaining a vacuum preferably less than 2 m. m. mercury pressure above the vapor tension of the water in vacuo and not more than 6 m. m. at the varying temperature of said water, a fitting for holding a second water receptacle in vacuum tight connection therewith external of the food compartment per se, a pump for withdrawing air and water vapor from both water containing receptacles, a check valve in said pump through which the condensed air and water vapor is discharged to atmosphere, suitable conduits for conveying said air and water vapor from both receptacles, an air gate valve for controlling communication through said conduits to the pump and to the receptacles, means for breaking the vacuum in the second receptacle in order to remove or afford access to the contents thereof, means for admitting a limited quantity of air into the first receptacle, and a motor for driving the pump.

JOHN J. BATTERMAN.